(12) United States Patent
Andresen et al.

(10) Patent No.: US 12,729,666 B2
(45) Date of Patent: Sep. 8, 2026

(54) MOBILE LIFTING APPARATUS AND METHOD AND SYSTEM FOR TRANSPORTING A COMPONENT OF A WIND TURBINE

(71) Applicant: Siemens Gamesa Renewable Energy A/S, Brande (DK)

(72) Inventors: Peter Andresen, Holstebro (DK); Jesper Moeller, Brande (DK); Michell Mirsbach Olsen, Aarhus C (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 370 days.

(21) Appl. No.: 17/910,923

(22) PCT Filed: Jan. 21, 2021

(86) PCT No.: PCT/EP2021/051276
§ 371 (c)(1),
(2) Date: Sep. 12, 2022

(87) PCT Pub. No.: WO2021/185494
PCT Pub. Date: Sep. 23, 2021

(65) Prior Publication Data

US 2023/0137516 A1 May 4, 2023

(30) Foreign Application Priority Data

Mar. 17, 2020 (EP) .................................... 20163484

(51) Int. Cl.

| | |
|---|---|
| ***F03D 13/40*** | (2016.01) |
| ***B66F 9/06*** | (2006.01) |
| ***B66F 9/24*** | (2006.01) |

(52) U.S. Cl.
CPC .............. *F03D 13/40* (2016.05); *B66F 9/063* (2013.01); *B66F 9/24* (2013.01); *F05B 2260/02* (2013.01)

(58) Field of Classification Search
CPC ........ F03D 13/40; B66F 9/063; B66F 9/0755; B66F 9/24; B66F 9/22; F05B 2260/02;
(Continued)

(56) References Cited

U.S. PATENT DOCUMENTS

| | | | | |
|---|---|---|---|---|
| 6,318,594 B1 * | 11/2001 | Hutchins | B65D 88/1668 222/530 |
| 8,733,778 B2 * | 5/2014 | Poulsen | B62D 33/0207 414/458 |

(Continued)

FOREIGN PATENT DOCUMENTS

| | | |
|---|---|---|
| CN | 102168653 A | 8/2011 |
| CN | 103159127 A | 6/2013 |

(Continued)

OTHER PUBLICATIONS

International Search Report and Written Opinion for PCT/EP2021/051276, issued on May 26, 2021.

*Primary Examiner* — Glenn F Myers
(74) *Attorney, Agent, or Firm* — Schmeiser Olsen PLLC

(57) ABSTRACT

A mobile lifting apparatus is provided for lifting an, in particular flat, transport frame on which a component of a wind turbine is mounted, in particular for removing or placing at least one self-propelled modular transporter below the transport frame, the lifting apparatus including: an upper part having an interface for connecting to a transport frame to be lifted, a lower part for supporting the lifting apparatus on the ground, and a lifting mechanism connecting the lower part to the upper part for linearly vertically moving the upper.

6 Claims, 7 Drawing Sheets

(58) Field of Classification Search
CPC ...... B65G 69/001; B65G 67/02; B65G 67/04; B65G 67/24
USPC ....... 414/679, 349, 352, 391, 399, 459, 458, 414/495, 540, 608, 785
See application file for complete search history.

(56) References Cited

U.S. PATENT DOCUMENTS

2003/0180132 A1* 9/2003 Morreim ............... B66C 19/005 414/458
2005/0123382 A1* 6/2005 Christensen ............ F03D 13/40 414/373
2011/0188975 A1* 8/2011 Salmoiraghi .......... B65G 67/02 414/391
2011/0211955 A1 9/2011 Eriksen
2019/0181730 A1 6/2019 Christensen
2022/0333579 A1* 10/2022 Karni ...................... F03D 13/40

FOREIGN PATENT DOCUMENTS

CN 204367772 U 6/2015
CN 105358470 A 2/2016
CN 109915319 A 6/2019
DK 177683 B1 3/2014
TW 201103837 A 2/2011
WO 2004/041589 A1 5/2004
WO 2012/171895 A1 12/2012
WO 2015/101375 A1 7/2015

* cited by examiner 1
2
3
4
5
6
7
8
9
10
11
12
13
14
15
16

FIG 2

MOBILE LIFTING APPARATUS AND METHOD AND SYSTEM FOR TRANSPORTING A COMPONENT OF A WIND TURBINE

CROSS-REFERENCE TO RELATED APPLICATIONS

This application claims priority to PCT Application No. PCT/EP2021/051276, having a filing date of Jan. 21, 2021, which claims priority to EP Application No. 20163484.7, having a filing date of Mar. 17, 2020, the entire contents both of which are hereby incorporated by reference.

FIELD OF TECHNOLOGY

The following concerns a mobile lifting apparatus for lifting an, in particular flat, transport frame on which a component of a wind turbine is mounted. The following further concerns a method and system for transporting a component of a wind turbine, in particular a wind turbine generator and/or a component comprising a wind turbine generator, on a vessel, wherein the component is mounted on an, in particular flat, transport frame.

BACKGROUND

The transport of heavy, compact components for wind turbines, which usually weigh multiple tons, is still a challenge. Examples for such heavy components in particular include wind turbine generator components fully assembled (nacelle, generator and hub), partly assembled (nacelle and generator) and as individual components hub, generator and/or nacelle. Two general concepts are known to allow transportation of such a component on a vessel.

The first concept is known as roll-on/roll-off (RORO). In this approach, the component is rolled on and off the vessel using self-propelled modular transporters (SPMT) or other self-propelled transporters. To enable this operation, the component is mounted on a heavy and expensive tunnel-frame.

In an alternative approach, which is termed lift-on/lift-off (LOLO), the component may be mounted on a cheaper and less complex flat transport frame, where, however, the vessel needs to be equipped with a crane or the like to hoist the component on the frame onto the vessel.

Compared to LOLO, RORO allows for faster loading/unloading, which makes it a less expensive alternative, however, flat frames do not fit with the RORO concept, since the SPMT or other self-propelled transporter cannot be released from a frame without tunnels.

SUMMARY

An aspect relates to allow for the use of less expensive flat transport frames without tunnels in an RORO approach.

A mobile lifting apparatus of embodiments of the current invention can be used for lifting an, in particular flat, transport frame, in particular without tunnels, on which a component of a wind turbine is mounted, in particular for removing or placing at least one self-propelled modular transporter below the frame, wherein the mobile lifting apparatus comprises:

- an upper part having an interface for connecting to a transport frame to be lifted,
- a lower part for supporting the lifting apparatus on the ground, and
- a lifting mechanism connecting the lower part to the upper part for linearly vertically moving the upper part with respect to the lower part.

The lifting apparatus thus provides a dedicated interface for connecting to a transport frame positioned on a vessel. The interface provides motion coupling, in particular attachment, at least vertically downwards, not necessarily in every direction. That is, during lifting, the transport frame may be attached by gravity. However, multiple variances of such an interface are conceivable, as will be further elaborated below.

The mobile lifting apparatus of embodiments of the current invention may be moved, self-propelled, to and away from the transport frame with the component thereon, and is of a size considerably smaller than the frame with the component, for example one tenth or smaller than the size of the transport frame carrying the component. That means at least three lifting apparatuses can be used for lifting, that is jacking up, the transport frame having the component mounted thereon. This allows, after loading and positioning on the vessel, to remove the self-propelled transporter from under the transport frame, wherein SPMTs are used. When the transport frame with the component mounted thereon is to be unloaded, the transport frame may, again, be lifted/jacked up using at least three, at least four, lifting apparatuses, such that the at least one self-propelled transporter, in particular SPMT, may again be placed below the frame and carry the frame once it is lowered accordingly by the lifting apparatuses.

Accordingly, a method for transporting a component of a wind turbine, in particular a wind turbine generator and/or a component comprising a wind turbine generator, on a vessel is provided in an aspect of embodiments of the invention, wherein the component is mounted on an, in particular flat, transport frame, in particular without tunnels, wherein the method comprises the steps of

- rolling the component onto the vessel using at least one self-propelled transporter, in particular SPMT,
- using at least three mobile lifting apparatuses, in particular according to embodiments of the invention, to lift the transport frame with the component,
- removing the at least one self-propelled transporter from under the lifted transport frame,
- lowering the frame using the lifting apparatuses to sit on the ground, and
- removing the lifting apparatuses.

In an embodiment, the method may further comprise

- transporting the component on the transport frame with the vessel to a destination,
- at the destination, using the mobile lifting apparatuses to lift the transport frame with the component,
- positioning the at least one self-propelled transporter below the lifted transport frame,
- lowering the frame onto the at least one self-propelled transporter using the lifting apparatuses,
- removing the lifting apparatuses,
- rolling the component from the vessel using the at least one self-propelled transporter.

In particular, connecting the lifting apparatuses to the transport frame comprises connecting, in particular attaching, the upper part to the transport frame using the interface. The vessel used may in particular be a water vessel, for example a ship. In this manner, wind turbine components can be transported to offshore destinations, where a wind turbine is to be erected.

As already mentioned, at least four lifting apparatuses are used. In particular, one lifting apparatus may be placed at each of the corners of the at least substantially rectangular transport frame. However, it is also possible to use more than four lifting apparatuses, for example at least six lifting apparatuses, wherein, for example, two additional lifting apparatuses may be placed at least substantially in the middle along the long sides of the at least substantially rectangular transport frame.

In summary, low-cost flat transport frames without tunnels may be used on low-cost vessels equipped for the RORO approach. The component on the transport frame may be loaded and unloaded using SPMT or similar self-propelled transporters without a crane.

In embodiments, the lower part of the lifting apparatus may comprise wheels and a drive mechanism forming a self-propelling device. In this manner, the lifting apparatus may be moved automatically, wherein, in particular, it is also possible to provide sensors and a control device to enable autonomous movement of the lifting apparatus to its respective connection position regarding the transport frame.

Regarding the method according to embodiments of the invention, the lifting apparatus having a self-propelling device may thus automatically move to its respective connection position at the transport frame. In particular, the mobile lifting apparatuses may move to their respective connection positions at least partly autonomously.

In an embodiment, the lower part may further comprise a ground support surface and the wheels may be retractable and/or movable to allow the ground support surface to be lowered to the ground. In this manner, the lifting apparatus may be supported firmly on the ground when the heavy loads of the transport frame and the component mounted thereon are to be lifted. That is, the retraction and/or moving away of the wheels takes place before the lifting apparatus is connected to the transport frame, or before the lifting apparatuses have to carry the weight of the transport frame and the component. Retraction and/or moving mechanisms to be employed in embodiments of the current invention are already known from the state of the art and need not be elaborated in detail here.

The lifting mechanism may comprise at least one telescopic rod, in particular at least two telescopic rods. For example, the telescopic rod may comprise a hydraulic piston and/or at least one threaded rod powered by an electric motor. While the force to lift the transport frame is thus provided hydraulically and/or electrically, in particular by moving a threaded rod, of course, also other options to provide the lifting force may be employed.

Regarding the interface, it may comprise, as at least one connection member, a trunnion and/or a hook and/or a pin and/or a sling and/or a padeye. In an embodiment, the at least one connection member matches a corresponding connection member of the transport frame. In an embodiment, the interface of each lifting apparatus may comprise a sling or hook, while the transport frame comprises a corresponding connection member, in particular a trunnion, pin, padeye, or hook, for each lifting apparatus, wherein, to connect the lifting apparatus to the transport frame, the sling or hook engages the corresponding connection member. In embodiments, a flexible sling may be used as connection member of the lifting apparatus. This sling may, for example, be made of a fibre material. Such fibre materials are generally very strong and thus able to support large weights, like the transport frame with the component mounted thereon. The transport frame, on the other hand, may comprise a connection member suitable to wrap the sling around it. In an embodiment, this may be a trunnion provided at a connection position at a side of the transport frame.

In an embodiment, the lifting apparatus may thus comprise two telescopic rods, wherein guiding tubes, in particular hollow cylindrical, are mounted to the lower part. The upper part is fastened on the top of the telescopic rods and may comprise, in a space between the two telescopic rods, the sling as connection member of the interface. In this manner, a cylindrical, robust and firm support for the connected transport frame is provided when the sling is wrapped around the corresponding connection member, in particular a trunnion, of the transport frame. While lifting the transport frame, the transport frame is then suspended in the slings of the employed lifting devices.

In embodiments of the invention, at least the lifting apparatuses are jointly, in particular synchronously and/or based on at least one user input, controlled by a central controlling device. It is thus desired to control the whole process in a central controlling device, wherein, for example, each lifting apparatus may be assigned a connection position, is automatically moved to the respective connection position, where the connection may be established manually or automatically. After establishing connection with the transport frame, the lifting devices may be synchronously controlled to lift the transport frame and the component mounted thereon to a predefined height, such that self-propelled transporters may be removed or positioned below the transport frame, as described. This positioning or removing may also be controlled by the central controlling device. After removing or positioning the self-propelled transporter, the lifting mechanisms of the lifting apparatuses may be controlled to lower the transport frame until it rests on the ground or on the at least one self-propelled transporter, respectively. After manually or automatically releasing the connection between the lifting apparatuses, in particular the interfaces, and the transport frame, the central controlling device may control the lifting apparatuses to automatically move away from the transport frame.

It is noted at this point that it is, in principle, also possible to automatically locate connection positions and autonomously drive the lifting apparatuses to these connection positions. For example, markers detectable by corresponding sensors may be placed at or near the connection members of the transport frame.

Embodiments of the invention also concern a system for transporting a component of a wind turbine, in particular a wind turbine generator and/or a component comprising a wind turbine generator, on a vessel, comprising an, in particular flat, transport frame, in particular without tunnels, for mounting the component thereon, and at least three, in particular at least four, mobile fixing apparatuses according to embodiments of the invention, wherein the interface of each fixing apparatus comprises a connection member adapted to engage a corresponding connection member of the transport frame.

All remarks and features regarding the fixing apparatus and the method according to embodiments of the invention analogously apply to the transport system according to embodiments of the invention, such that the same advantages are achieved. In particular, the flat transport frame may have shorter or no legs for standing on, but may instead have the connection members, in particular at a side. In embodiments, the connection member of the interface of each fixing apparatus may be or comprise a sling, while the connection member of the transport frame may be or comprise a trunnion.

The system according to embodiments of the invention may also comprise the at least one self-propelled transporter and/or the at least one central controlling device, as described above.

BRIEF DESCRIPTION

Some of the embodiments will be described in detail, with reference to the following figures, wherein like designations denote like members, wherein:

FIG. 2 shows an embodiment of a mobile lifting apparatus;

DETAILED DESCRIPTION

Figure 1:
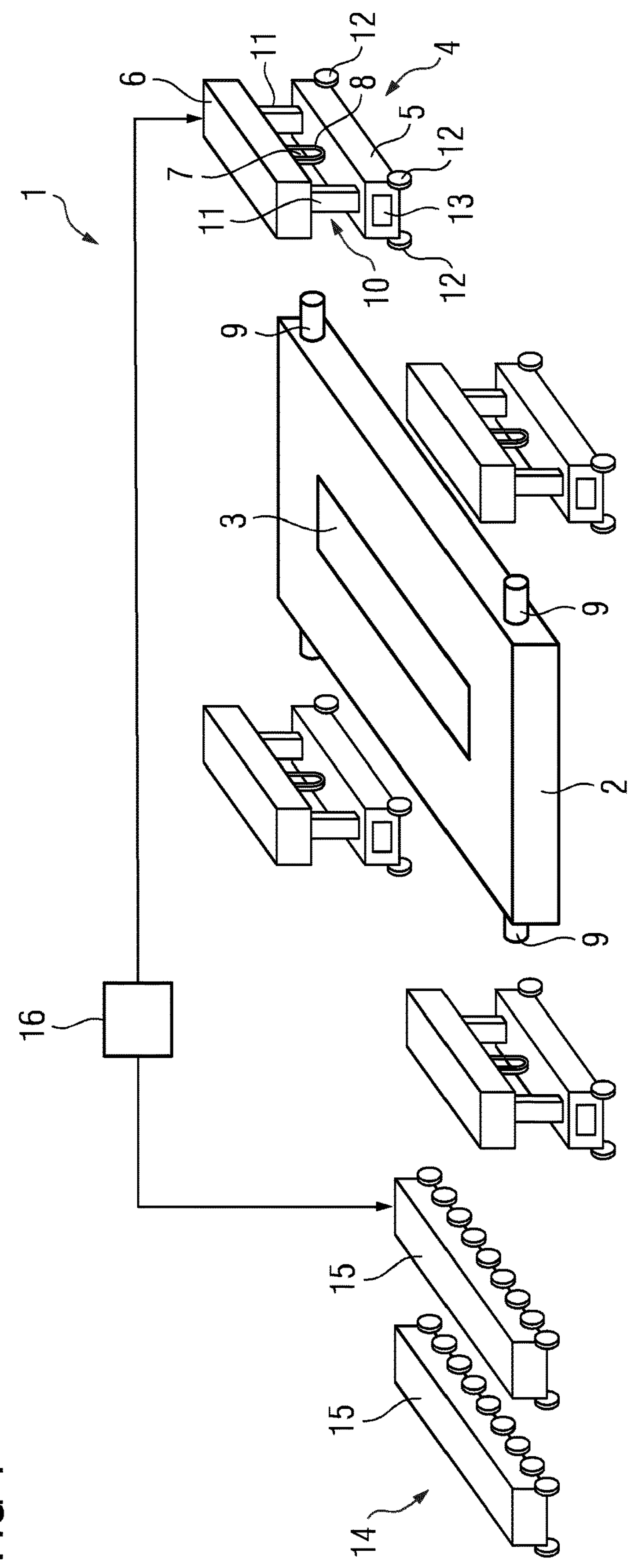
FIG. 1 shows a schematic overview over a system according to embodiments of the invention.

FIG. 1 shows a principle drawing of components of a system 1 for transporting a wind turbine component according to embodiments of the invention. The system 1 comprises a flat transport frame 2 which is of a simple, cost-effective construction and in particular comprises no tunnels. Such flat transport frames 2 are, for example, known from the above-described LOLO transport approach. The transport frame 2 comprises, as in principle known in the art, a mounting device 3 for mounting the components.

In this embodiment, the transportation system 1 further comprises four mobile lifting apparatuses 4, but may also comprise further mobile lifting apparatuses 4, for example six or more lifting apparatuses. The lifting apparatuses 4 generally comprise a lower part 5 and an upper part 6, wherein the upper part 6 comprises an interface 7 with at least one connection member 8 which is adapted to engage a corresponding connection member 9 of the transport frame 2. For example, as will be explained further below, the connection member 8 of the interface 7 may be a sling, while the corresponding connection member 9 of the transport frame 2 may be a trunnion around which the sling may wrap.

The lifting apparatus 4 further comprises a lifting mechanism 10 which, in this case, comprises two telescopic rods 11 which may in turn comprise a hydraulic piston or a threaded rod powered by an electric motor.

To establish mobility of the mobile lifting apparatuses 5, the lower part 5 comprises wheels 12 and a drive mechanism 13 to form a self-propelling device.

The transportation system 1 in this embodiment further comprises two self-propelled transporters 14, in this case two SPMTs 15. The SPMTs 15 and the lifting apparatuses 4, in particular their lifting mechanisms 11 and their drive mechanisms 13, may be controlled by a central controlling device 16, which may be in wireless communication with the SPMTs 15 and the lifting apparatuses 4. In particular, at least partly autonomous operation of the SPMTs 15 and the lifting apparatuses 4 may be implemented, in particular by also providing corresponding sensors (not shown).

Figure 2:
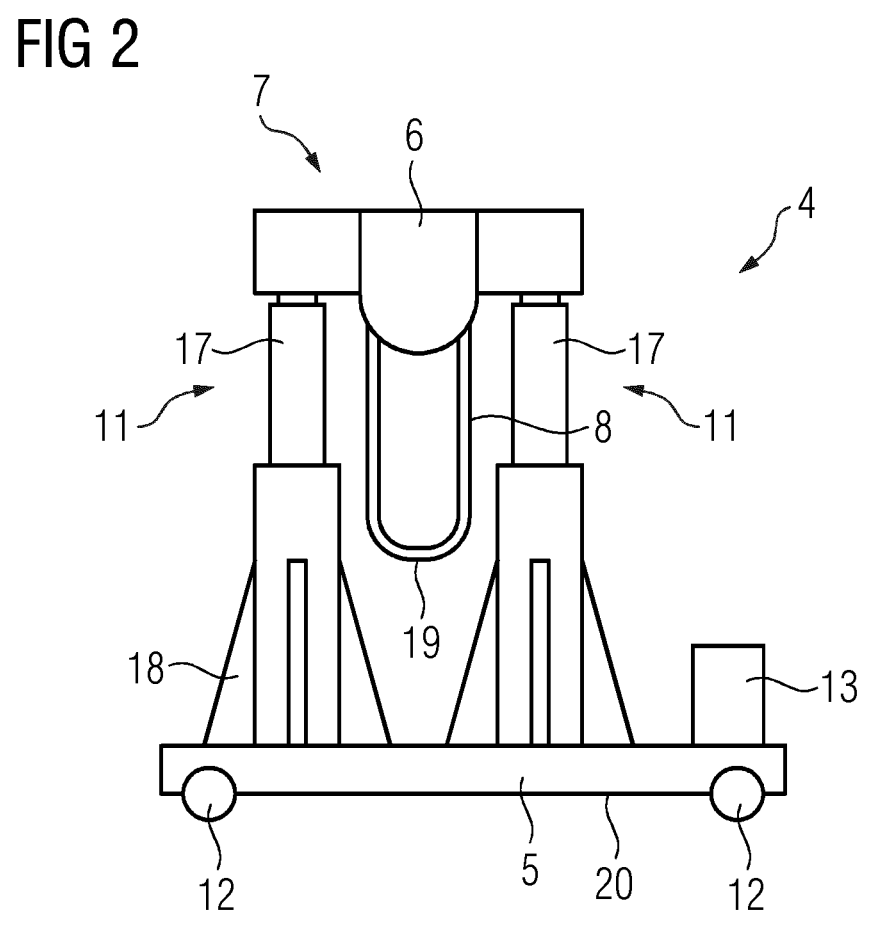

FIG. 2 shows an exemplary embodiment of a lifting apparatus 4. In this case, the lifting apparatus 4 comprises two telescopic rods 11 each comprising a hydraulic piston 17. The telescopic rods 11 are further supported by stabilising fins 18 on lower part 5. In the middle between the telescopic rods 11 the interface 7 having a sling 19 as connection member 8 is located. The wheels 12 may be retracted into a base plate of lower part 5 such that a ground support surface 20 rests on the ground, providing a firm standing of the lifting apparatus 4.

The system 1 may be used in a method according to embodiments of the invention, as will now be explained with respect to FIGS. 3 to 9.

Figure 3:
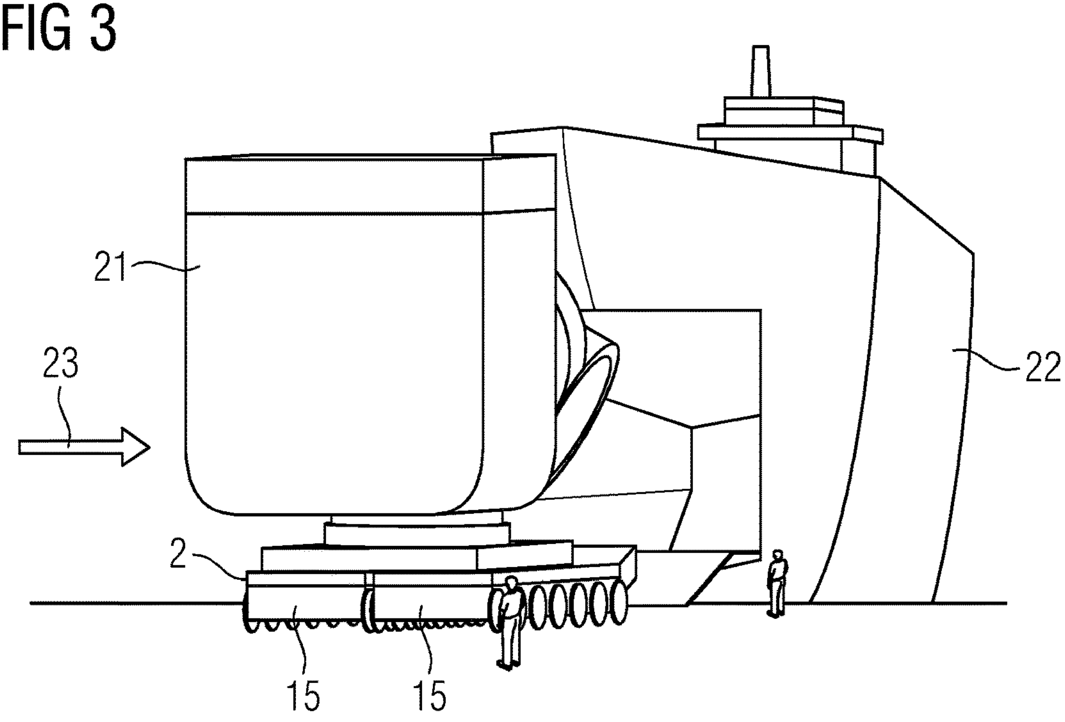
FIG. 3 shows transporting a component of a wind turbine into a vessel.

In FIG. 3, a wind turbine component 21 is already mounted on the transport frame 2, which, in turn, is supported on the SPMTs 15 such that the component 21 can be rolled onto a vessel 22 adapted for the use of the above-explained RORO approach. This loading process is indicated by arrow 23. The vessel 22, in this case, is a ship.

Figure 4:
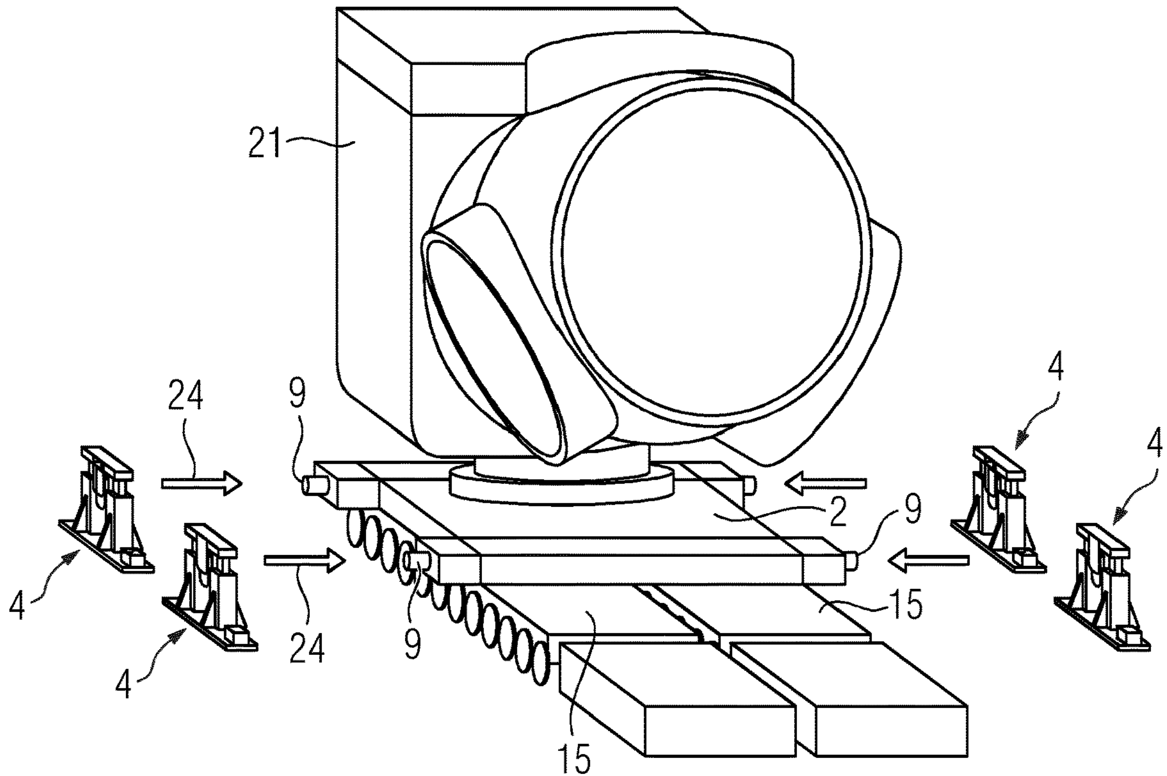
FIG. 4 shows moving lifting apparatuses to connection positions.
Figure 5:
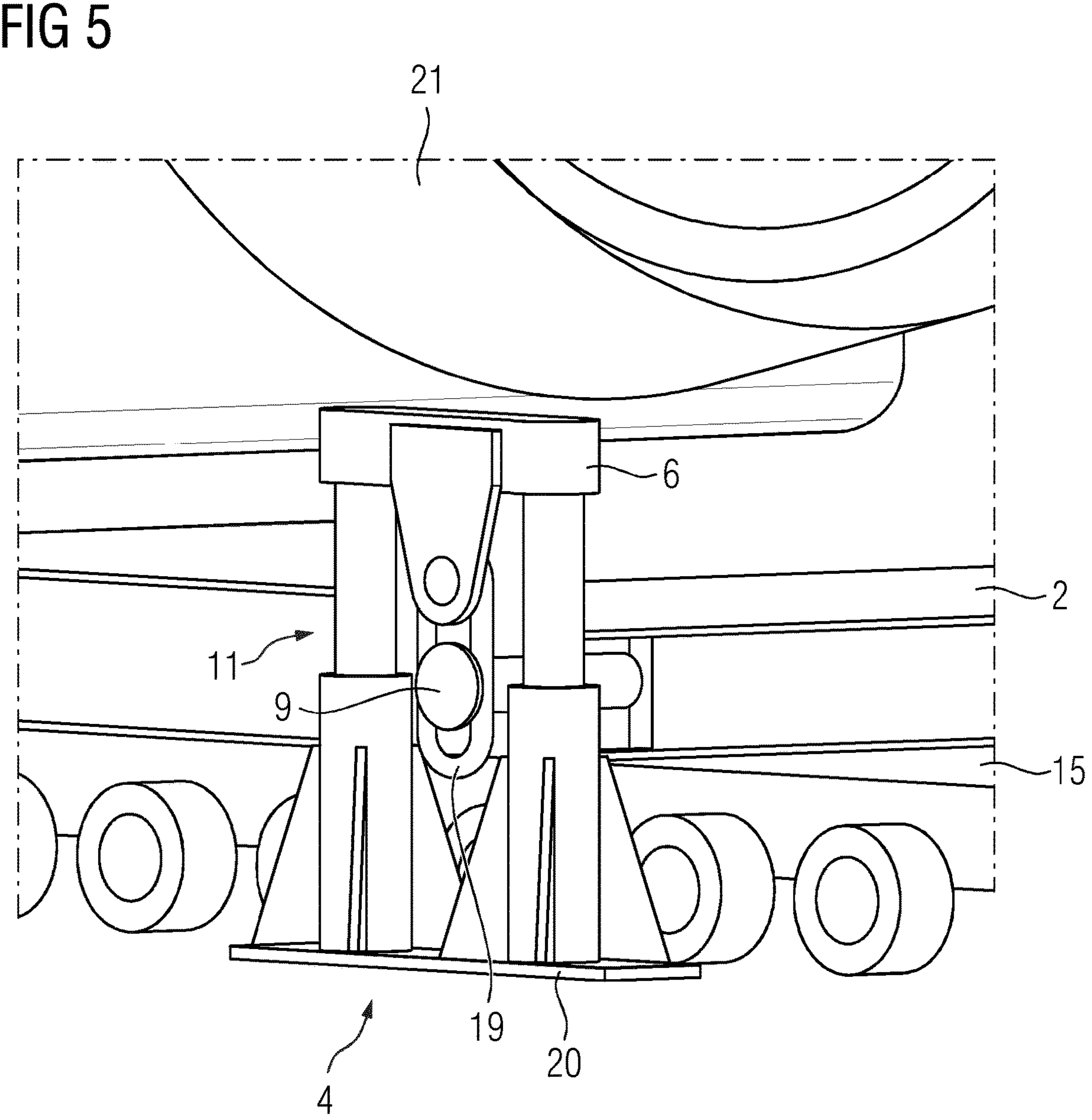
FIG. 5 shows connecting a lifting apparatus to a transport frame.

As shown in FIG. 4, the frame 2 with the component 21 has reached its storage position on the vessel 22. As a next step in the method, the, in this case, four lifting apparatuses 4 are moved to corresponding connection positions defined by the connection members of the transport frame 2. This is indicated by arrow 24. Once the connection position is reached, the lifting apparatuses 4 are connected to the transport frame 2 as shown in FIG. 5. The sling 19 is wrapped around the connection member 9 of the transport frame 2 such that, when telescopic rods 11 lift the upper part 6, the corresponding connection member 9, in particular the trunnion, is suspended in the sling 19 used as connection member 8.

Figure 6:
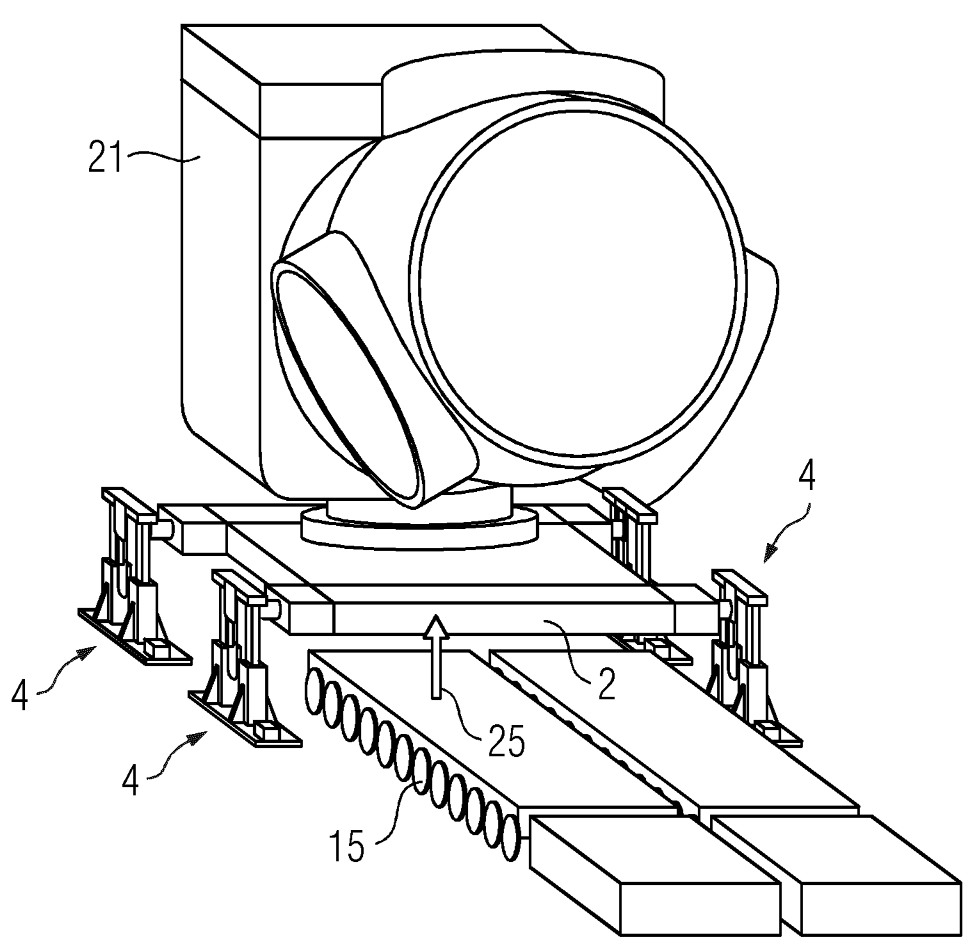
FIG. 6 shows lifting the transport frame and the component.

As shown in FIG. 6, the lifting mechanisms 10 of all lifting apparatuses 4 are now synchronously controlled by the controlling device 16 to uniformly lift the transport frame 2 with the component 21, which are now freely suspended in the slings 19 of the lifting apparatuses 4 and no longer rest on the SPMTs 15. The lifting process is indicated by arrow 25.

Figure 7:
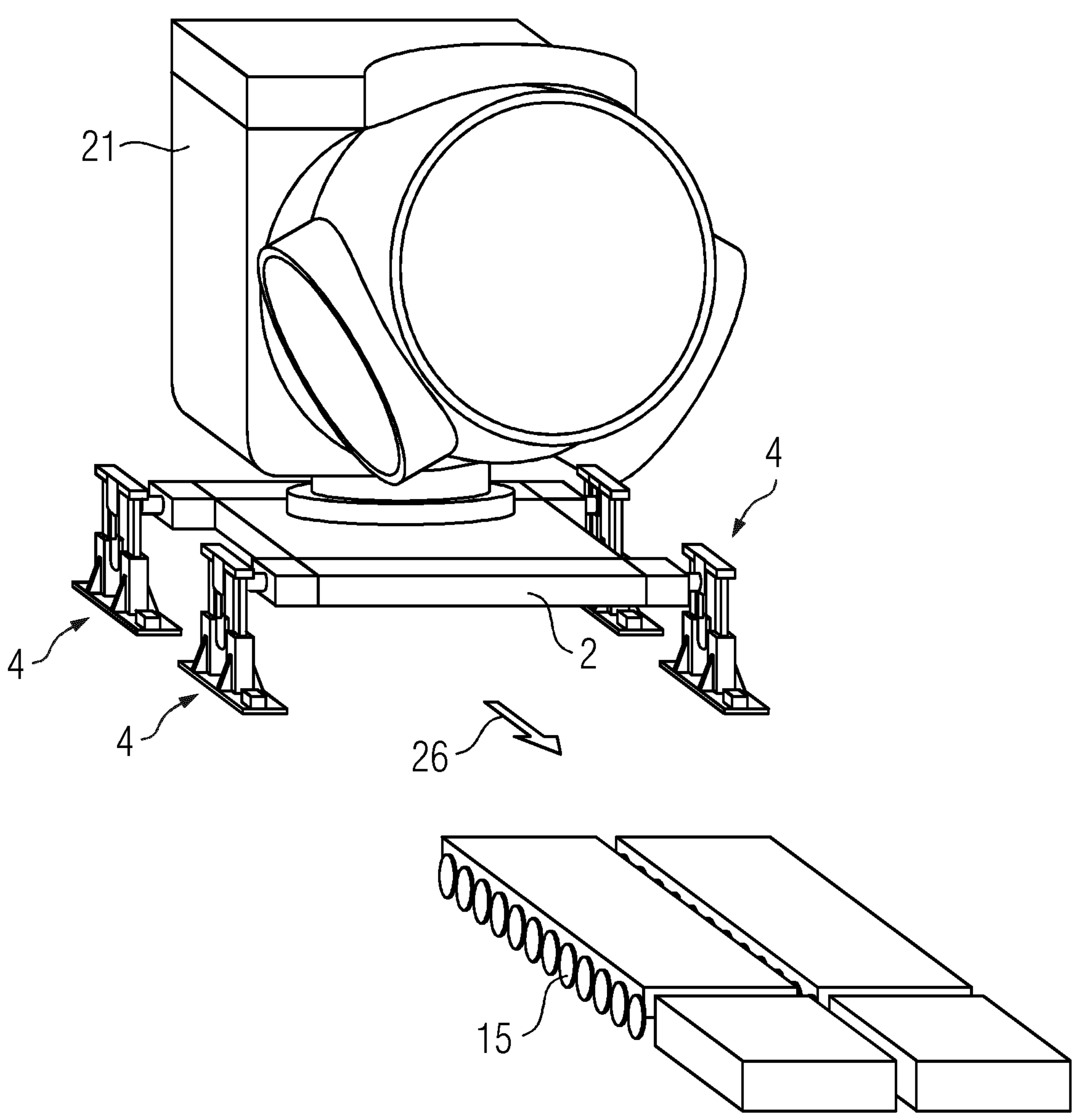
FIG. 7 shows removing SPMTs.

Thus, as shown in FIG. 7, the SPMTs 15 can now be removed from below the transport frame 2.

Figure 8:
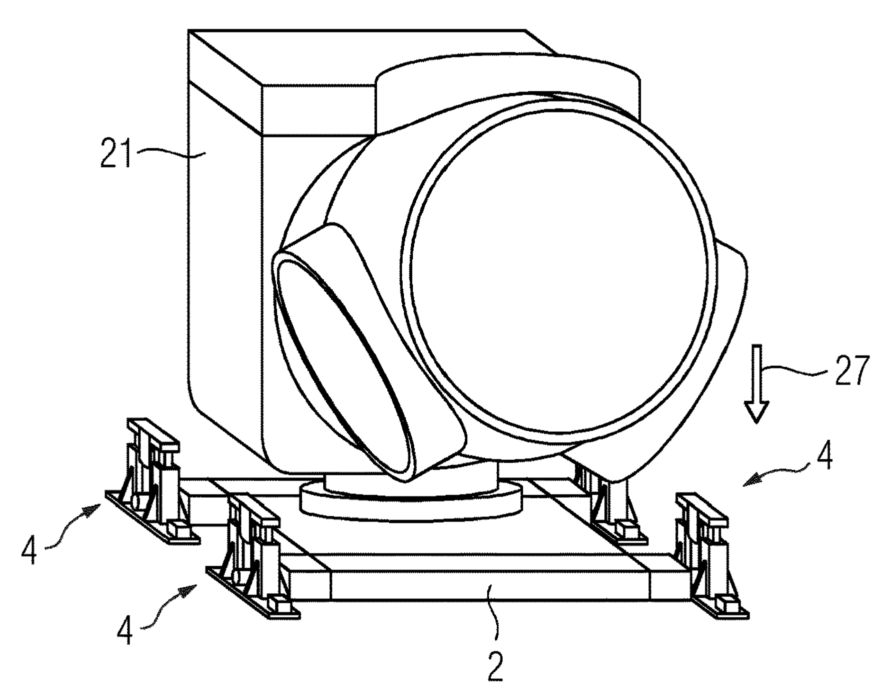
FIG. 8 shows lowering the transport frame and the component.

After the SPMTs 15 have been removed according to arrow 26, as shown in FIG. 8, the lifting mechanisms 10 of the lifting apparatuses 4 are again synchronously controlled to lower the transport frame 2 with the component 21 mounted thereon to the ground, as indicated by arrow 27.

Figure 9:
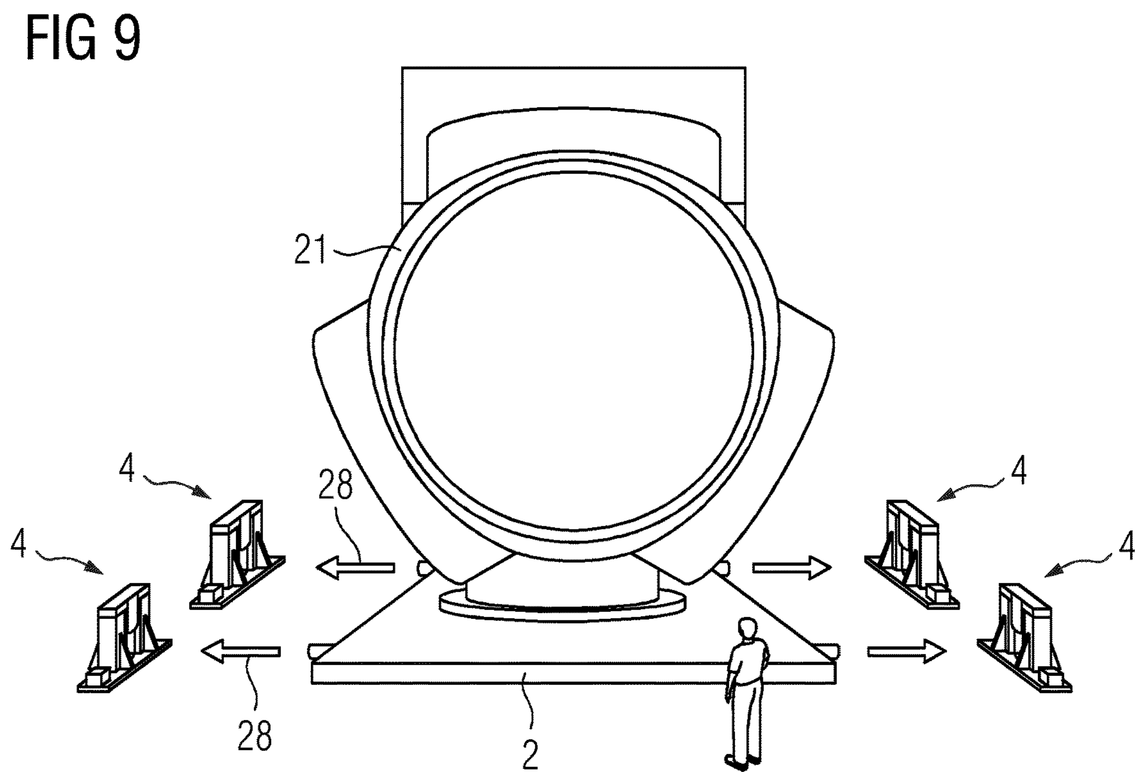
FIG. 9 shows removing the lifting apparatuses.

After this, the frame 2 with the wind turbine component 21 is securely stored in the vessel 22 and the lifting apparatuses 4 can be disconnected from the frame 2 and removed, as indicated by arrow 28 in FIG. 9.

If, at a later time, after the vessel 22 has reached its destination, the component 21 on the frame 2 is to be unloaded, the steps described above are essentially performed in the opposite order, that is, the lifting apparatuses 4 are moved into the connection positions, connected to the frame 2, the frame 2 is lifted, the SPMTs 15 are moved below the transport frame 2, the transport frame 2 is lowered again such that it rests on and is supported by the SPMTs 15, the lifting apparatuses 4 are removed and the component 21 can be unloaded by rolling it out of the vessel 22.

It is noted that, in this example, the component 21 is shown as being a component 21 comprising the nacelle with the wind turbine generator housed therein and the hub. However, the component 21 may also be the wind turbine generator itself, the nacelle or hub without generator, or the nacelle with the generator housed therein. Of course, also other components of the wind turbine can be transported as described above.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for transporting a component of a wind turbine on a vessel, wherein the component is mounted on a flat transport frame, the method comprising:

- rolling the component onto the vessel using at least one self-propelled transporter;
- using at least three mobile lifting apparatuses, to lift the flat transport frame with the component from the at least one self-propelled transporter;
- removing the at least one self-propelled transporter from under the lifted flat transport frame;
- lowering the flat transport frame using the lifting apparatuses to sit on the ground; and
- removing the lifting apparatuses.

2. The method according to claim 1, wherein the method further comprises:

- transporting the component on the flat transport frame with the vessel to a destination;
- at the destination, using the lifting apparatuses to lift the flat transport frame with the component;
- positioning the at least one self-propelled transporter below the lifted flat transport frame,
- lowering the flat transport frame onto the at least one self-propelled transporter using the lifting apparatuses;
- removing the lifting apparatuses; and
- rolling the component from the vessel using the at least one self-propelled transporter.

3. The method according to claim 1, wherein the lifting apparatus has a self-propelling device, and the lifting apparatuses automatically move to connection positions at the transport frame.

4. The method according to claim 3, wherein the lifting apparatuses move to the connection positions at least partly autonomously.

5. The method according to claim 1, wherein at least the lifting apparatuses are jointly and/or based on at least one user input, controlled by a central controlling device.

6. The method according to claim 1, wherein the interface of each lifting apparatus comprises a sling or hook, while the flat transport frame comprises a corresponding connection member, for each lifting apparatus, wherein, to connect the lifting apparatus to the flat transport frame, the sling or hook engages the corresponding connection member.

* * * * *